Jan. 1, 1929.

J. R. NOLAN

CLOTHESPIN

Filed March 28, 1927

1,697,250

Inventor:
John R. Nolan

Patented Jan. 1, 1929.

1,697,250

UNITED STATES PATENT OFFICE.

JOHN R. NOLAN, OF NEW YORK, N. Y.

CLOTHESPIN.

Application filed March 28, 1927. Serial No. 178,837.

This invention relates to wooden clothes-pins, its principal object being to reinforce a forked clothes-pin in a simple, inexpensive and efficient manner whereby the splitting or breaking of the pin is prevented when the legs thereof are subjected to excessive spreading strain.

The invention consists, primarily, in the combination with a clothes-pin, of a reinforcing device therefor comprising a ring of wire encircling the pin adjacent the junction of the legs and having extended end portions tightly twisted together and positioned in the space between the legs in such a manner that an excessive spreading strain on the legs of the pin tends to increase the locking effect of the inwardly-bent twisted portions of the wire.

The invention also comprises features of construction and combinations of parts which together with the method of reinforcing the clothes-pin, will be hereinafter described and claimed.

In the drawings—

Figure 1:
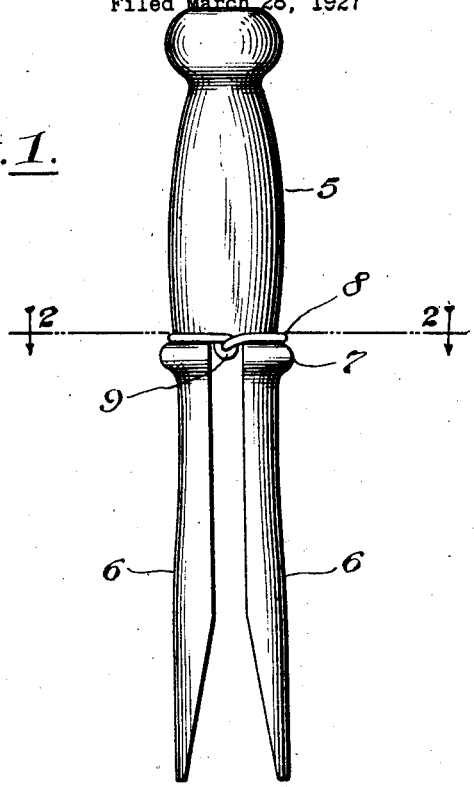
Figure 1 is a side elevation of a clothes-pin, enlarged, embodying my invention.
Figure 2:
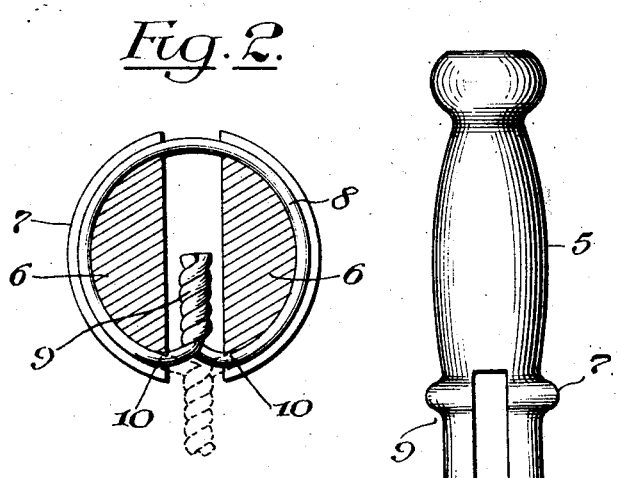
Fig. 2 is a transverse section of the pin, as on the line 2—2 of Fig. 1.
Figure 3:
Fig. 3 is a partial view of a clothes-pin without the reinforcing device.

The clothes-pin illustrated comprises a wooden body 5 having integral depending legs 6 spaced apart as usual to afford a pair of yielding gripping members, which members are preferably provided adjacent the crotch with a peripheral bead 7.

Encircling the pin, immediately above the bead, i. e., at the side of the bead nearer the head of the pin, is a ring, 8, of wire having extended end portions which are tightly twisted together, as at 9, and bent hard into the space between the legs so as to abut against the crotch of the latter the untwisted portions of the wire which span the space and merge with the inwardly-bent twisted portions, thus bearing against the opposing lateral corners of the legs. This wire ring is thus firmly held in position on the pin adjacent the crotch since the bead 7 serves as a permanent stop to prevent downward movement, and the twisted portion abutting against the opposing crotch prevents upward displacement of the ring, and this irrespective of the contraction and expansion of the wood incident to its exposure to varying weather conditions while the pin is in service on a clothes-line.

From the foregoing described simple construction it will be seen that the clothes-pin is effectually reinforced and the splitting thereof at or in the vicinity of the crotch is prevented, without impairing the lateral flexibility of the legs, thus prolonging the life of the pin.

It will also be seen that the tight twisting and forcible inward bending of the wire causes the ring to bite into the opposing corners 10 of the legs, thus contributing to the stability of the device. Again, relatively fine wire can be used for the reinforcing ring, since the twisting together of the end extensions of the wire and their inward bending into the space between the legs not only ensures its tight relation to the outer surface of the wood, but it also provides a stiff and rigid retaining member whereof the inwardly bent or flexed basal portion at its juncture with the converging portions of the wire effectually resist spreading strains applied to the legs of the clothes-pin, thereby preventing the separation of the twisted extensions and obviating liability of splitting the pin above the crotch. Moreover, a relatively short piece of wire, slightly exceeding the circumference of the body of the pin, is required, thus minimizing the cost in large production.

If desired, the bead 7 may be omitted; or as a substitute for the bead an annular groove or arcuate grooves for the reception of the ring may be formed in the pin, without departure from my invention.

I claim—

1. The combination with a wooden clothes-pin consisting of a body having spaced depending legs, of a reinforcing wire closely encircling the pin adjacent the crotch of the legs and having extended end portions tightly twisted together at the space between the legs and bent over into said space to extend transversely of the pin, the untwisted portions of the wire which span the space between the legs and merge in the inwardly-bent twisted portions, bearing against the opposing lateral corners of the legs and being permanently locked together intermediate the legs by the said inwardly-bent twisted portions.

2. The combination with a wooden clothes-pin consisting of a body having spaced depending legs and a peripheral retaining portion adjacent the crotch of the legs of a reinforcing wire closely encircling the pin in co-operative relation to the said retaining portion and having extended end portions tightly twisted together at the space between the legs and bent over into said space to extend transversely of the pin the untwisted portions of the wire which span the space between the legs and merge in the inwardly-bent twisted portions, bearing against the opposing lateral corners of the legs and being permanently locked together intermediate the legs by the said inwardly-bent twisted portions.

3. The combination with a wooden clothes-pin consisting of a body having spaced depending legs and a peripheral bead formed adjacent the junction of the legs, of a reinforcing wire encircling the pin at the side of the bead nearer the head of the clothes-pin and having extended end portions tightly twisted together at the space between the legs and bent over into said space to extend transversely of the pin, the untwisted portions of the wire which span the space between the legs and merge in the inwardly-bent twisted portions, bearing against the opposing lateral corners of the legs and being permanently locked together intermediate the legs by the said inwardly-bent twisted portions.

4. A method of reinforcing bifurcated clothes-pins, comprising bending a suitable length of wire around the pin adjacent the crotch to provide a ring having outwardly extending end portions at the space between the legs, tightly twisting together the said outwardly extending end portions to cause the encircling wire to grip the pin, and then bending the twisted portion of the wire into the space between the legs of the pin whereby the untwisted portions of the wire which span the space between the legs and merge in the inwardly-bent twisted portions, bear against the opposing lateral corners of the legs and are permanently locked together intermediate the legs by the said inwardly-bent twisted portions.

Signed at New York in the county and State of New York this 25th day of March, A. D. 1927.

JOHN R. NOLAN.